United States Patent
Kurosaki et al.

(10) Patent No.: US 8,081,290 B2
(45) Date of Patent: Dec. 20, 2011

(54) LIQUID CRYSTAL DISPLAY PANEL MANUFACTURING METHOD AND DEVICE

(75) Inventors: Yoshihisa Kurosaki, Kawasaki (JP); Junji Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 180 days.

(21) Appl. No.: 12/205,404

(22) Filed: Sep. 5, 2008

(65) Prior Publication Data

US 2009/0009707 A1 Jan. 8, 2009

Related U.S. Application Data

(63) Continuation of application No. PCT/JP2006/304343, filed on Mar. 7, 2006.

(51) Int. Cl.
*G02F 1/1341* (2006.01)
(52) U.S. Cl. ......... 349/189; 349/154
(58) Field of Classification Search .......... None
See application file for complete search history.

(56) References Cited

U.S. PATENT DOCUMENTS

| | | | | |
|---|---|---|---|---|
| 5,854,664 | A * | 12/1998 | Inoue et al. | 349/92 |
| 6,195,149 | B1 * | 2/2001 | Kodera et al. | 349/187 |
| 2002/0063838 | A1 * | 5/2002 | Choi et al. | 349/154 |
| 2002/0159020 | A1 * | 10/2002 | Sojourner et al. | 349/189 |
| 2003/0223029 | A1 * | 12/2003 | Lee | 349/153 |
| 2008/0115883 | A1 * | 5/2008 | Mishima et al. | 156/273.3 |

FOREIGN PATENT DOCUMENTS

| | | |
|---|---|---|
| JP | 5-265014 A | 10/1993 |
| JP | 7-318957 A | 12/1995 |
| JP | 2511341 B2 | 6/1996 |
| JP | 8-201747 A | 8/1996 |
| JP | 11-149083 A | 6/1999 |
| JP | 2002-287157 A | 10/2002 |

OTHER PUBLICATIONS

International Search Report of PCT/JP2006/304343, date of mailing May 23, 2006.

* cited by examiner

*Primary Examiner* — Mark Robinson
*Assistant Examiner* — Mary El Shammaa
(74) *Attorney, Agent, or Firm* — Fujitsu Patent Center (57) ABSTRACT

A liquid crystal display panel 20 is manufactured by applying a seal agent 19 to at least of a pair of substrates 10, 12, enclosing the cell region 14; opposing the pair of substrates 10, 12 at a prescribed gap to define a cell space 14; depressurizing the interior of the cell space 14 through an opening 13 formed in at least one of the pair of substrates 10, 12 to thereby securely bond the pair of substrate 10, 12 to each other; and injecting a liquid crystal into the cell space 14. The atmospheric pressure is applied to the pair of substrates 10, 12, whereby a uniform external pressure is applied, and the glass substrates can be securely bonded to each other in good condition.

6 Claims, 8 Drawing Sheets

LIQUID CRYSTAL DISPLAY PANEL MANUFACTURING METHOD AND DEVICE

CROSS REFERENCE TO RELATED APPLICATIONS

This application is a Continuation of International Application No. PCT/JP2006/304343, with an international filing date of Mar. 7, 2006, which designating the United States of America, the entire contents of which are incorporated herein by reference.

TECHNICAL FIELD

The present invention relates to a liquid crystal display panel manufacturing method and device for manufacturing a liquid crystal display panel.

BACKGROUND

Recently, liquid crystal display devices using liquid crystal materials are popular in the daily life. As methods of forming liquid crystal display devices, various modes such as TN (Twisted Nematic) mode liquid crystal, STN (Super Twisted Nematic) mode liquid crystal, TSTN (Triple Super Twisted Nematic) mode liquid crystal, etc., are used. In any one of such different modes, to manufacture the liquid crystal display device, a pair of glass substrates with transparent electrodes formed on are bonded, a liquid crystal is injected into the display cells formed between the pair of glass substrates to form a liquid crystal panel, the liquid crystal panel is processed, and the liquid crystal device is manufactured.

Background arts are disclosed in, e.g., Japanese Laid-open Patent Publication No. 2002-287157, Japanese Patent No. 2511341, Japanese Laid-open Patent Publication No. H05-265014, Japanese Laid-open Patent Publication No. H07-318957, and Japanese Laid-open Patent Publication No. H08-201747.

However, in the conventional manufacturing methods, a pair of glass substrates are bonded to each other to be secured by applying a seal agent to one of the glass substrate of the pair of glass substrates, opposing said one glass substrate to the other glass substrate and physically pressurizing both sides.

The method of physically pressing the pair of glass substrates on both sides cannot avoid disuniform pressure in the glass substrates and has a problem that this causes disuniform gaps of the display cells. It is also a problem that when foreign objects, such as particles, etc., are present on the glass substrates, the glass substrates are damaged by the press. As the liquid crystal display device is thinned, the above-described problems are more serious.

When plastic substrates are used in place of glass substrates, the method of physically pressurizing a pair of plastic substrates on both sides has a problem that when foreign objects, such as particles, etc., are present on the plastic substrates, the plastic substrates are deformed by the pressurization. A problem is that, when a liquid crystal is injected, the air in the display cells is expanded to thereby deform the plastic substrates, and bonded parts are released.

SUMMARY

According to one aspect of an embodiment, there is provided a liquid crystal display panel manufacturing method including the steps of: applying a seal agent to at least one of a pair of substrate, as enclosing the cell region; opposing the pair of glass substrates at a prescribed gap therebetween to form a cell space; depressurizing the interior of the cell space through an opening formed in at least one of the pair of substrates to securely bond the pair of substrates to each other, and injecting a liquid crystal into the cell space.

DETAILED DESCRIPTION OF THE EMBODIMENTS

A First Embodiment

The liquid crystal display panel manufacturing method according to a first embodiment will be explained with reference to FIGS. 1 to 3.

Figure 1A:
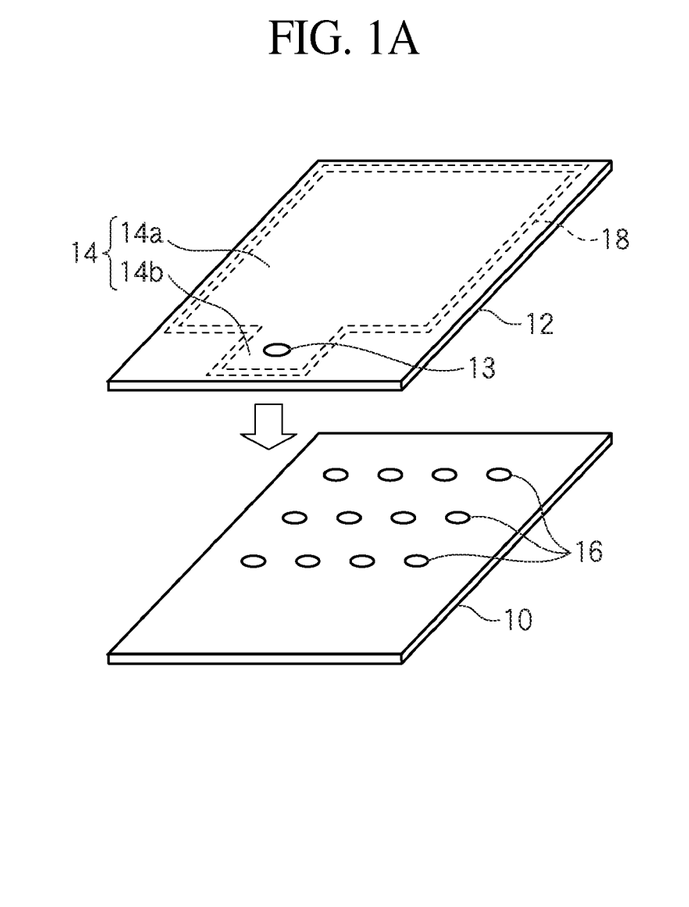
FIGS. 1A and 1B are views of the steps of the liquid crystal display panel manufacturing method according to a first embodiment.
Figure 1B:
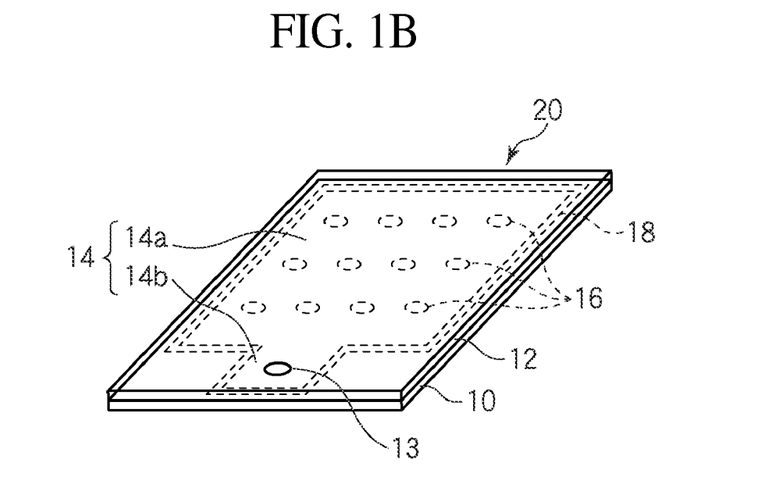
Figure 2A:
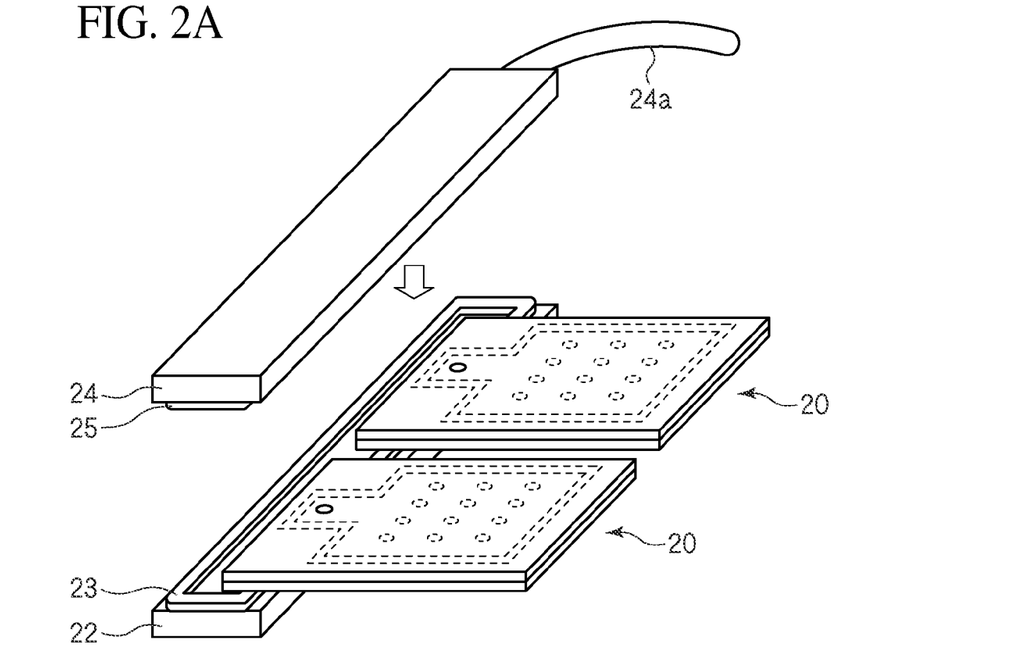
FIGS. 2A and 2B are views of the steps of the liquid crystal display panel manufacturing method according to a first embodiment.
Figure 2B:
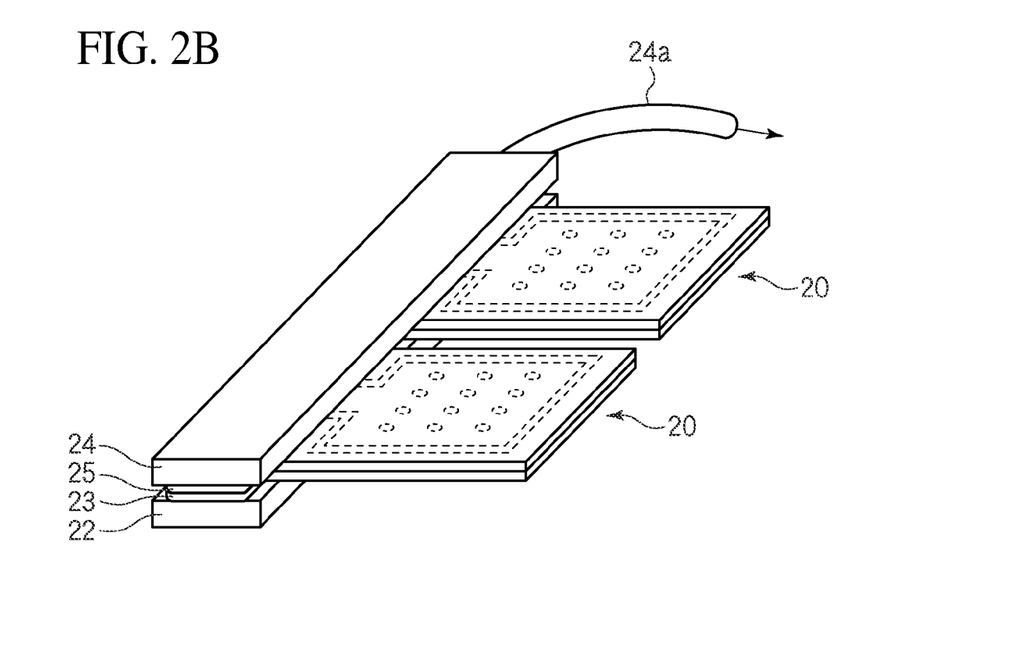
Figure 3A:
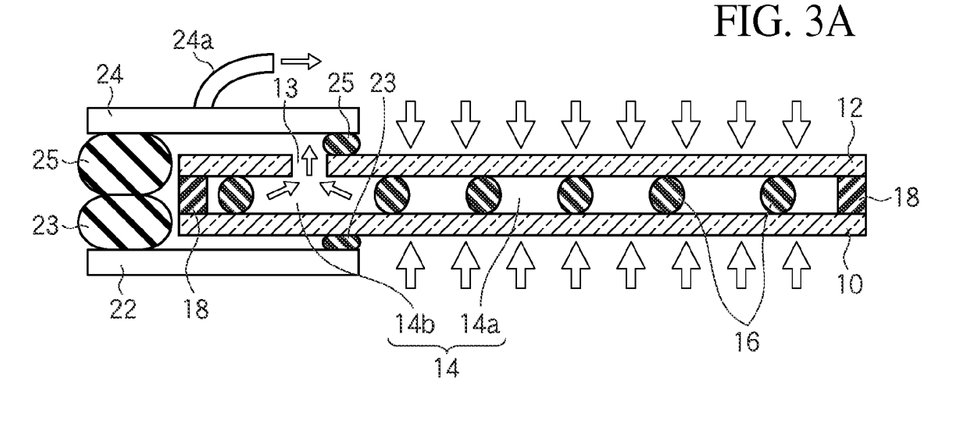
FIGS. 3A to 3C are views of the steps of the liquid crystal display panel manufacturing method according to a first embodiment.
Figure 3B:
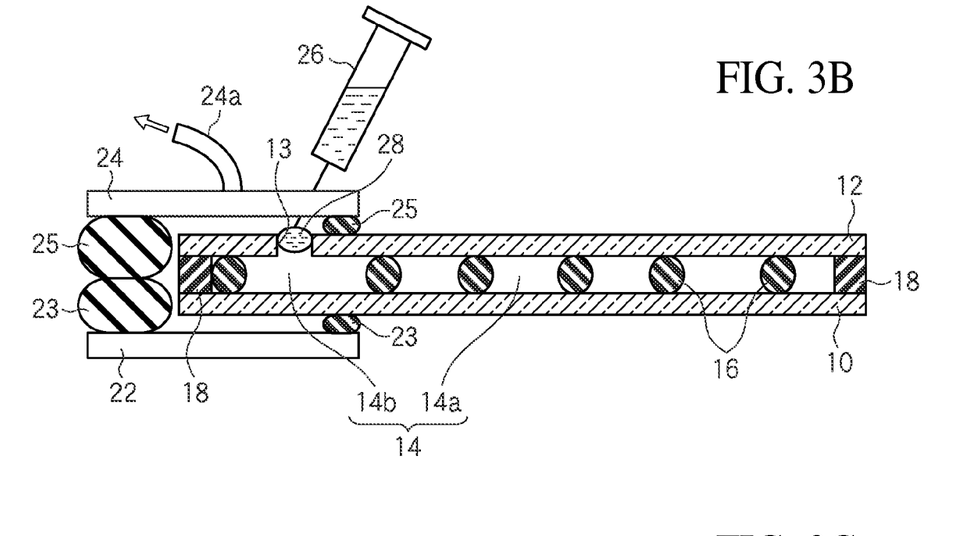
Figure 3C:
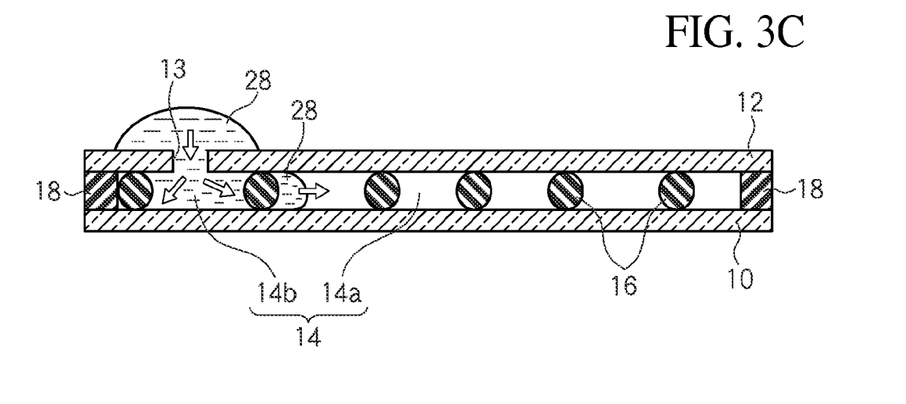

FIGS. 1A and 1B are views of the steps of the liquid crystal display panel manufacturing method according to the present embodiment, FIGS. 2A and 2B are views of the steps of the liquid crystal display panel manufacturing method according to the present embodiment, and FIGS. 3A to 3C are views of the steps of the liquid crystal display panel manufacturing method according to the present embodiment.

First, as illustrated in FIG. 1A, a pair of glass substrate 10, 12 are prepared. The glass substrates 10, 12 have the size of, e.g., a 0.2 mm thickness, a 80 mm longitudinal length and a 100 mm lateral length.

Spacers 16 are distributed on one glass substrate 10 in the cell region 14 where cells are to be formed. The spacers 16 are distributed for uniformly retaining a prescribed distance in the cell region 14 when the 2 glass substrates 10, 12 are opposed to each other. The spacers 16 have, e.g., a 5.0 μm φ ball-shape as illustrated in FIG. 1A, but may have another shape.

To the other glass substrate 12, a seal agent 18 is applied, enclosing the cell region 14. The cell region 14 contains a rectangular region 14a of, e.g., a 60 mm longitudinal length and an 80 mm lateral length provided with an appendix region 14b for the evacuation and the injection of a liquid crystal which will be described later. The appendix region 14b has a rectangular shape of, e.g., a 15 mm longitudinal length and a 10 mm lateral length.

Substantially in the glass substrate 12 at the center of the appendix region 14b, an opening 13, of, e.g., a 4 mm diameter is formed.

As the seal agent 18, for example, a epoxy-based thermo-curing resin, an acryl-based photo-curing resin, etc. is used.

Then, as illustrated in FIG. 1B, the glass substrate 12 is aligned with the glass substrate 10, and the liquid crystal panel 20 is formed. In this state, the glass substrate 19 is only temporarily mounted on the glass substrate 10 in alignment therewith, and the par of glass substrates 10, 12 are not still perfectly bonded and secured.

Then, as illustrated in FIG. 2A, two liquid crystal display panels 20 in this state are prepared, and as illustrated in FIG. 2B, the additional regions 14b of the two liquid crystal display panels 20 are sandwiched by a couple of retaining plates 22, 24. An evacuation pipe 24a is provided in the retaining plate 24. The pipe 24a is connected to an evacuation pump (not illustrated). Silicone rubber 23, 25 is provided on the peripheries of the surfaces of the retaining plates 22, 24, which are to be opposed to each other.

FIG. 3A is a sectional view of the liquid crystal panels 20 sandwiched by the couple of the retaining plates 22, 24 (FIG. 2B). Each pair of glass substrates 10, 12 are opposed to each other via the spacers 16 with the cell region 14 tightly closed with the seal agent 18.

On the other hand, as illustrated in FIG. 3A, the gaps between each liquid crystal panel 20 retained by the retaining plates 22, 24 and the retaining plates 22, 24 are also tightly closed with silicone rubber 23, 25. The tightly closed space is in communication with the cell region 14 tightly closed between the glass substrates 10, 12 via the opening 13 formed in the glass substrate 12 in the appendix region 14b.

In this state, when an evacuation is made through the pipe 24a with an evacuation pump (not illustrated), the interiors of the cell spaces of the cell regions 14 are depressurized through the spaces between the retaining plates 22, 24 and through the openings 13. This causes the atmospheric pressure to be exerted to the surfaces of the glass substrates 10, 12, and the glass substrates 10, 12 are bonded to each other and secured.

The interiors of the cell regions 14 are depressurized to thereby cause the atmospheric pressure to be exerted uniformly to the glass substrates 10, 12, whereby the problems of the disuniform gaps, the damage of the glass substrates, etc. can be prevented.

At this time, when a thermo-curing resin is used as seal agent 18, the whole is heated with a thermostatic oven (not illustrated).

When a photo-curing resin is used as the seal agent 18, light is applied to the whole from the outside to cure the seal agent 18.

Next, when the glass substrate 10, 12 are bonded and secured, as illustrated in FIG. 3B, with the pressure kept decreased, a liquid crystal of, e.g., 0.1 cc is dropped by the injection means 26 through the openings 13 of the glass substrates 12 to cover the openings 13 with the liquid crystal 28.

Next, the evacuation with the vacuum pump (not illustrated) is stopped, and the decreased pressure in the space between the retaining plates 22, 24 is released. At this time, the interiors of the cell regions 14 are under the decreased pressure, and as illustrated in FIG. 3C, the liquid crystal 28 covering the openings of the glass substrates 112 is injected into the cell regions 14 through the openings 13.

Thus, the liquid crystal display panels 20 each including the pair of glass substrates 10, 12 opposed to each other with a prescribed gap retained therebetween and the liquid crystal 28 injected in the cell space is completed.

Then, the appendix regions 14b of the liquid crystal panels 20 are cut off. Peripheral circuits, etc. are provided, and the liquid crystal display devices are completed. These steps are not detailed here.

As described above, according to the present embodiment, the atmospheric pressure is applied to the glass substrates, and a uniform external force is applied to the glass substrates, whereby the generation of the problems of disuniform gaps between the conventional display cells, damages of the glass substrates, etc. can be prevented, and the glass substrates can be bonded and secured in good condition.

A Second Embodiment

The liquid crystal display panel manufacturing method according to a second embodiment will be explained with reference to FIGS. 4 to 8.

Figure 4A:
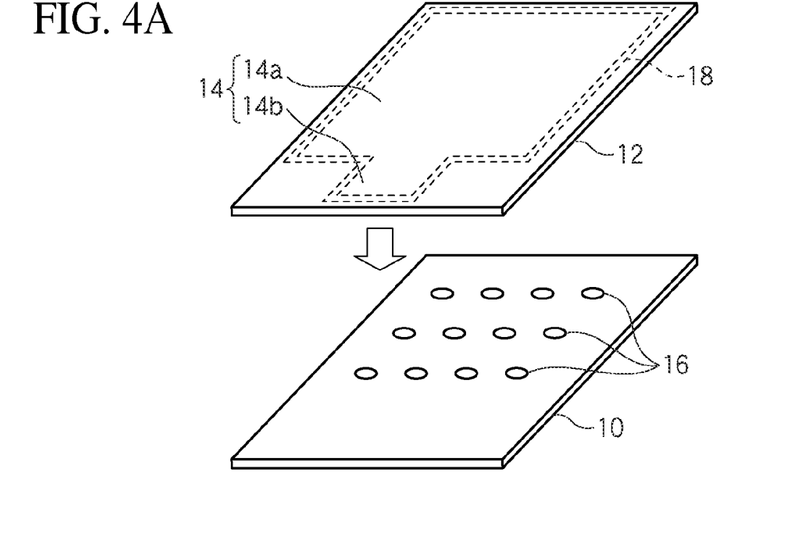
FIGS. 4A to 4C are views of the steps of the liquid crystal display panel manufacturing method according to a second embodiment.
Figure 4B:
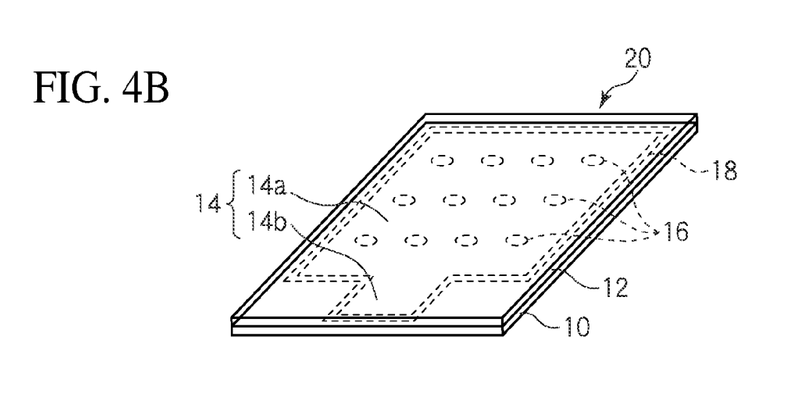
Figure 4C:
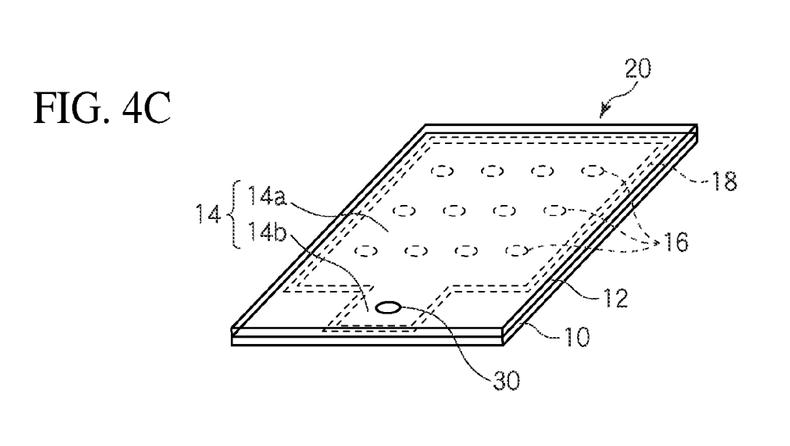
Figures 5A, 5B:
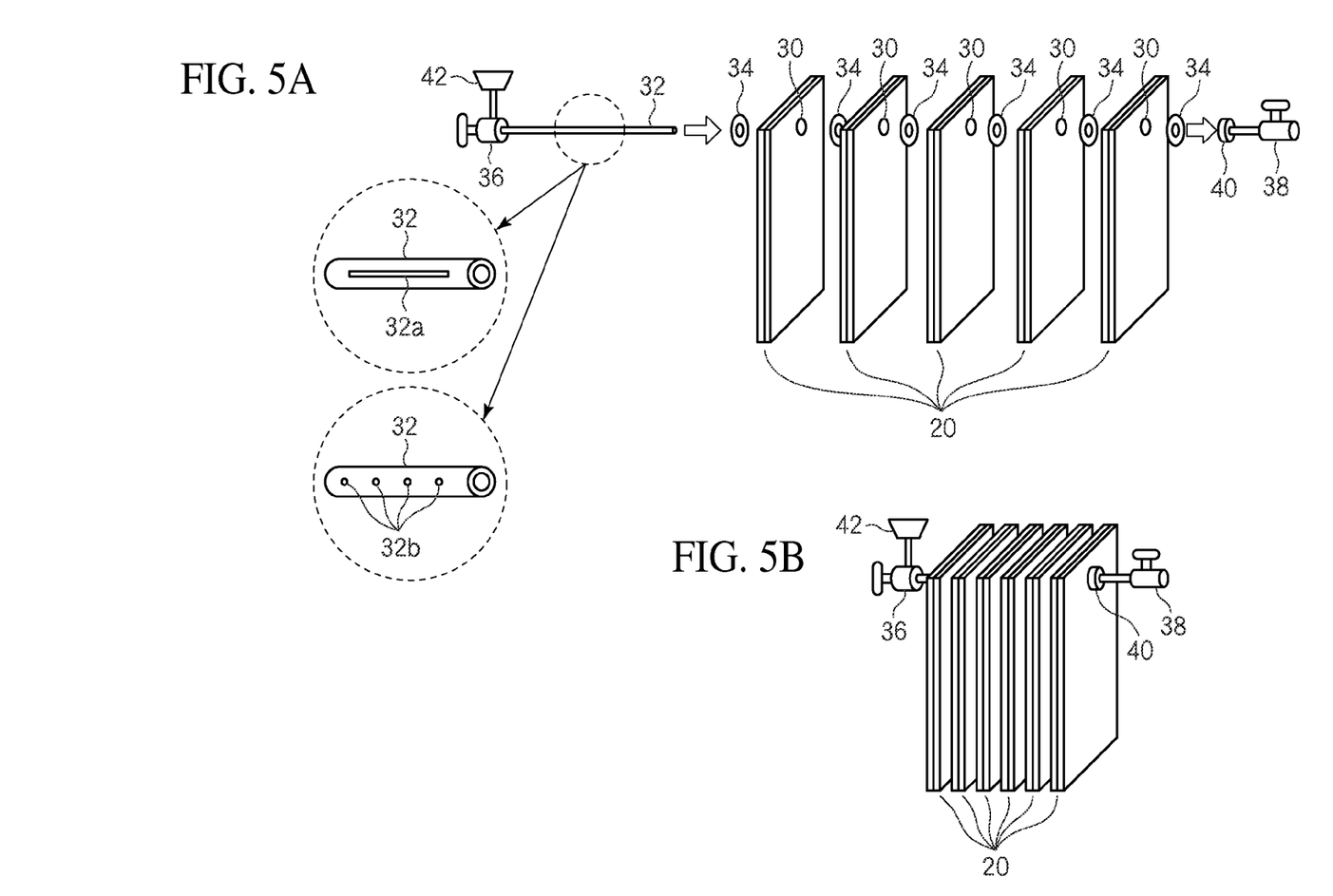
FIGS. 5A and 5B are views of the steps of the liquid crystal display panel manufacturing method according to a second embodiment.
Figure 6:
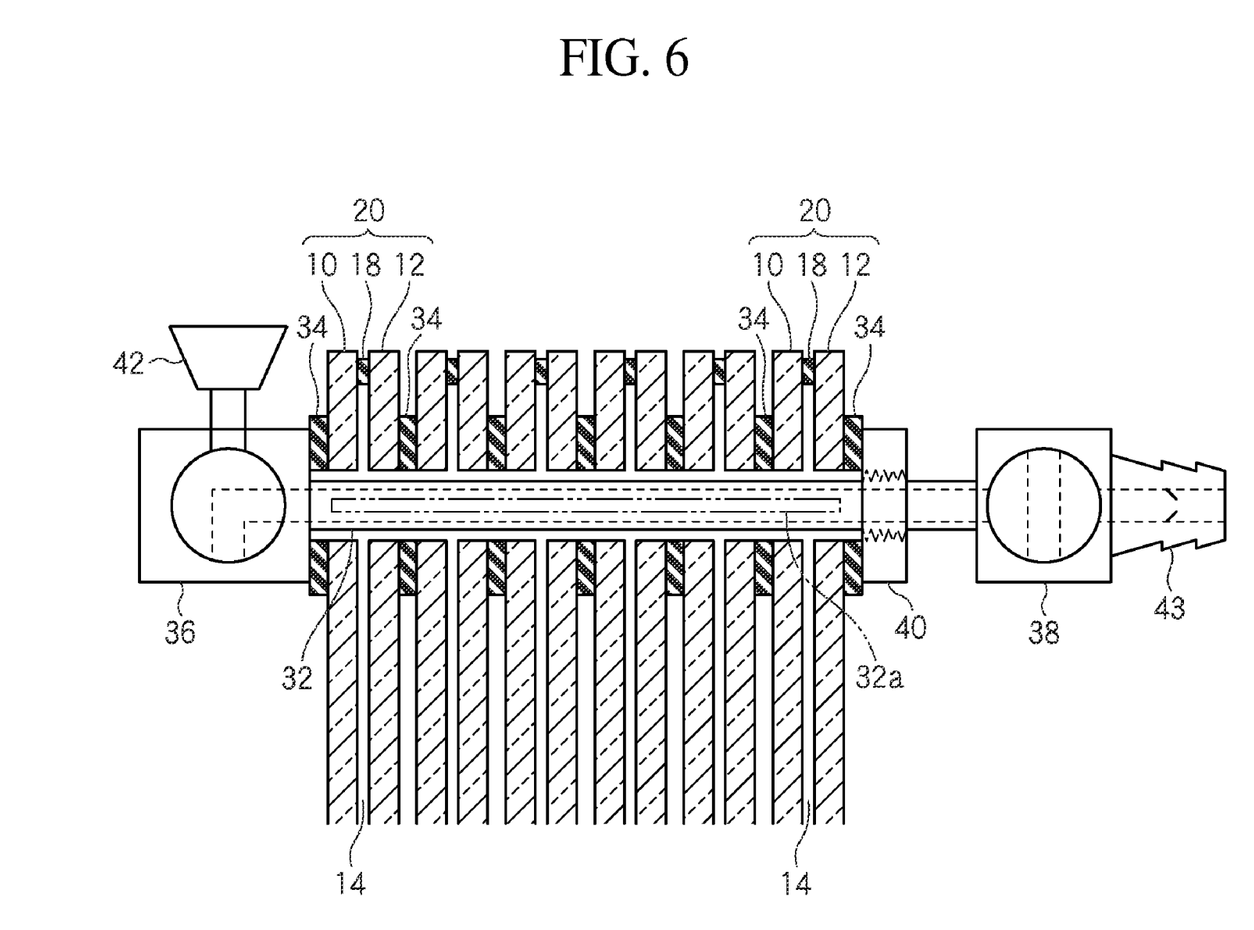
FIG. 6 is a view of the step of the liquid crystal display panel manufacturing method according to a second embodiment.
Figure 7A:
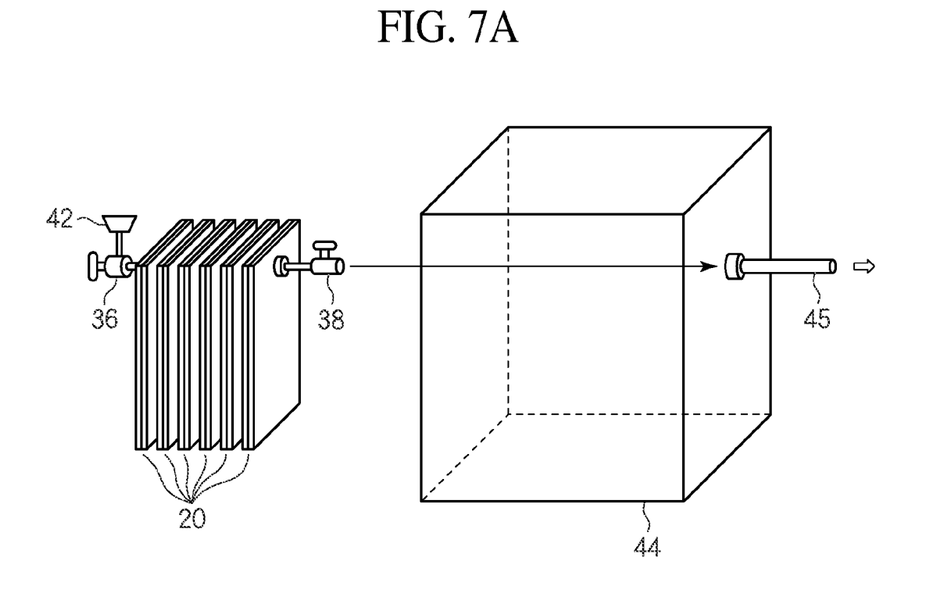
FIGS. 7A and 7B are views of the steps of the liquid crystal display panel manufacturing method according to a second embodiment.
Figure 7B:
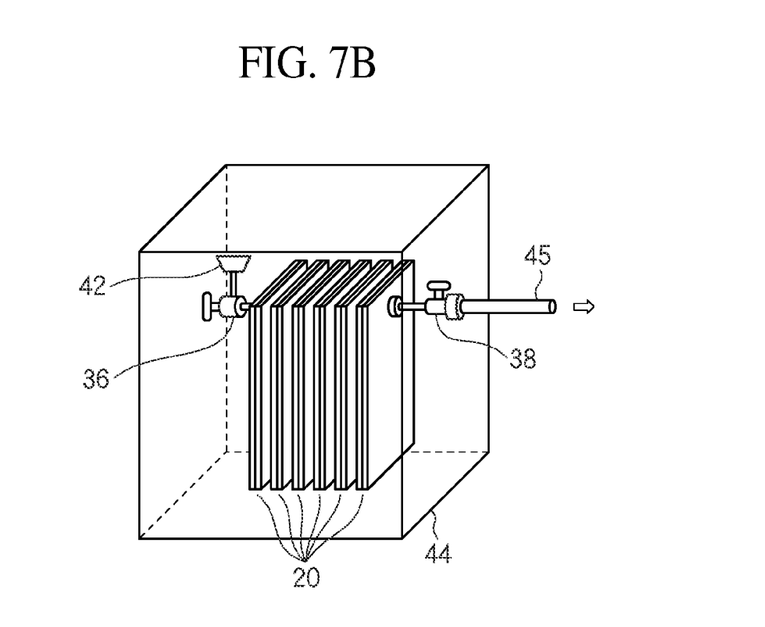
Figure 8A:
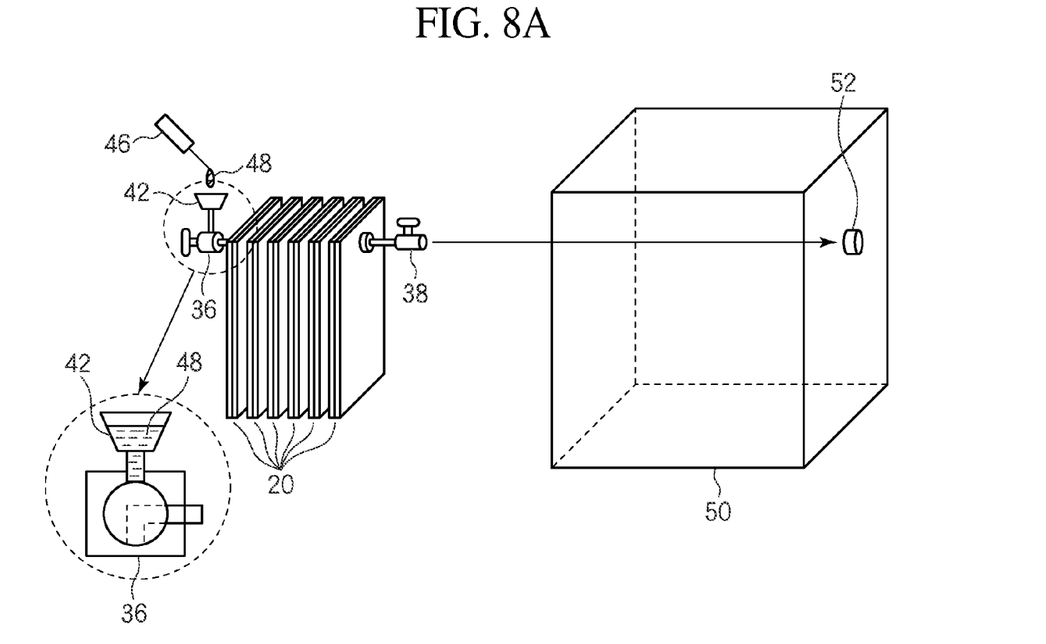
FIGS. 8A and 8B are views of the steps of the liquid crystal display panel manufacturing method according to a second embodiment.
Figure 8B:
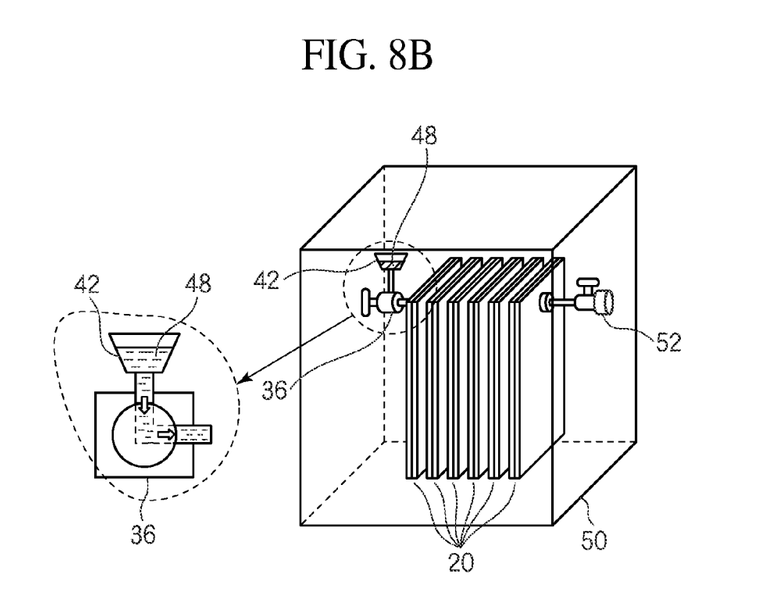

FIGS. 4A to 4C are views of the steps of the liquid crystal display panel manufacturing method according to the present embodiment, FIGS. 5A and 5B are views of the steps of the liquid crystal display panel manufacturing method according to the present embodiment, FIG. 6 is a view of the step of the liquid crystal display panel manufacturing method according to the present embodiment, FIGS. 7A and 7B are views of the steps of the liquid crystal display panel manufacturing method according to the present embodiment, and FIGS. 8A and 8B are views of the steps of the liquid crystal display panel manufacturing method according to the present embodiment.

The liquid crystal display panel according to the present embodiment is basically the same as the liquid crystal display panel according to the first embodiment but is characterized in that a plurality of liquid crystal display panels can be simultaneously manufactured.

First, as illustrated in FIG. 4A, a pair of glass substrates 10, 12 are prepared. Spacers 16 are distributed on the one glass substrate 10 in the cell region 14 where cells are to be formed, and on the other glass substrate 12, a seal agent 18 is applied, enclosing the cell region 14. No opening is formed in the appendix region 14b of the cell region 14 of the glass substrate 12.

Next, as illustrated in FIG. 4B, the glass substrate 12 is aligned with the glass substrate 10, and the liquid crystal display panel 20 is formed. In this state, the glass substrate 19 is only temporarily mounted on the glass substrate 10 in alignment therewith, and the par of glass substrates 10, 12 are not still perfectly bonded and secured.

Next, as illustrated in FIG. 4C, a through-hole 30 of, e.g., a 4 mm diameter is formed in the glass substrates 10, 12 at the center of the appendix region 14b of the cell region 14. It is possible to form openings in advance in the respective glass substrates 10, 12 at the same position as the center of the appendix region 14b, and the lass substrates 10, 12 are aligned with the openings thereof agreed with each together to form the through hole 30.

Then, as illustrated in FIG. 5A, a plurality of the liquid crystal display panels 20 in this state are prepared and are arranged with the through-holes 30 of the liquid crystal display panels in agreement with each other. A pipe 32 is put through the through-holes 30 to interconnect the plurality of liquid crystal display panels as illustrated in FIG. 5B.

The pipe 32 is made of, e.g., stainless steel and has a cylindrical shape of a 3.0 mm outer diameter and a 2.5 mm inner diameter and, as illustrated in FIG. 5A, a slit 32a of, e.g., a 1.0 mm width and a 10 mm length formed in the side surface. In place of the slit 32a, as illustrated in FIG. 5A, a plurality of openings 32b of, e.g., a 1.0 mm diameter may be formed, distributed over a 10 mm length.

Ring-shaped packings 34 are inserted at the connections between the liquid crystal display panels 20 so as to prevent the liquid crystal display panels from contacting each other and resultantly being damaged. The packings 34 is made of, e.g. silicone rubber and has a doughnut-shape of a 1.0 mm thickness, a 7.0 mm outer diameter and a 4.0 mm inner diameter.

As illustrated in FIG. 5A, a two-way cock 36 for injecting a liquid crystal is provided in advance on the end of the pipe 32, and a two-way cock 38 for evacuation is separately provided. The pipe 32 is put through the through-holes 30 of the liquid crystal display panels 30, and the end is connected to the two-way cock 38 for evacuation.

FIG. 6 illustrates the detailed structure of the connected parts of the plurality liquid crystal display panels 20. The pipe 32 is put through the through-holes 30 of the plurality of liquid crystal display panels 20 and fastened with a screw 40, and the plurality of liquid crystal display panels are interconnected with each other with packings 34 provided therebetween The two-way cock 36 for injecting a liquid crystal is provided on one end of the pipe 32, and the two-way cock 38 for evacuation is provided on the other end. The two-way cock 36 has a liquid crystal receiver 42. The two-way cock 38 has a check valve 43.

In the present embodiment as well, in each liquid crystal display panel 20, a pair of glass substrates 10, 12 are opposed to each other with spacers 16 positioned therebetween, and the cell regions 14 is tightly closed with a seal agent 18.

The spaces of the through-holes 30 of each liquid crystal display panel 20 between the two-way cock 36 and the screw 40 is in communication with the cell region 14 and are tightly-closed with the packings 34. In the spaces of the through-holes 30, the pipe 32 with the slit 32a is put through and has one end connected to the two-way click 36 and the other end connected to the two-way cock 38.

Thus, the two-way cocks 36, 38 are in communication with the cell regions 14 through the slit 32a of the pipe 32 and the spaces of the through-holes 30 located outer of the pipe 32.

Next, as illustrated in FIG. 7A, the interconnected liquid crystal display panels 20 are loaded in a thermostatic oven 44, and the two-way cock 38 for evacuation is connected to the connection port 45 of the thermostatic oven 44. Subsequently, as illustrated in FIG. 7B, the two-way cock 38 for evacuation is opened to evacuate with a vacuum pump (not illustrated) through the connection port 45 with the cock 36 for the liquid crystal injection closed.

In this state, when the evacuation is made through the connection port 45 with the vacuum pump (not illustrated), the interiors of the cell regions 14 are depressurized through the two-way cock 38 for evacuation, the pipe 32, the slit 32a, the spaces of the through-holes 30 outer of the pipe 32. Thus, the atmospheric pressure is applied to the surfaces of the glass substrates 10, 12, and the glass substrates 10, 12 are bonded to each other and secured.

The interiors of the cell regions 14 are depressurized, and the glass substrates 10, 12 are uniformly pressurized by the atmospheric pressure, whereby problems of disuniform gaps between the conventional display cells and the damage of the glass substrates, etc. do not take place.

At this time, when the seal agent 18 is a thermo-curing resin, the thermostatic oven 44 is heated to, e.g., 160 degrees C. to cure the seal agent 18.

When the seal agent 18 is a photo-curing resin, light is applied to the whole from the outside to cure the seal agent 18.

Next, when the glass substrates 10, 12 are bonded and secured, with the two-way cock 36 for the liquid crystal injection kept closed, the two-way cock 38 for evacuation is closed, and the interconnected liquid crystal panels 30 are unloaded out of the thermostatic oven 44.

Next, as illustrated in FIG. 8A, a liquid crystal 48 of, e.g., 1 cc is dropped by injection means 46 into the liquid crystal receiver 42 of the two-way cock for the liquid crystal injection. At this time, the two-way cock 36 for the liquid crystal injection is left closed. Then, the interconnection liquid crystal display panels 20 are loaded into another thermostat 50 kept at a temperature for the liquid crystal injection, e.g., 70 degrees C., and the two-way cock 38 for evacuation is connected to the connection port 52 of the thermostatic oven 50.

Next, as illustrated in FIG. 8B, the two-way cock 38 for the liquid crystal injection is opened, and the liquid crystal 48 dropped into the liquid crystal receiver 42 is injected into the cell region 14, which are in the decreased pressure state, through the spaces of the through-holes 30 outer of the pipe 32.

Thus, the plurality of liquid crystal display panels 20 each including a pair of glass substrates 10, 12 opposed to each other at a prescribed gap, forming the cell space and the liquid crystal 48 injected in the cell space are completed at once.

Then, the appendix regions 14b of the respective liquid crystal display panels 20 are cut, peripheral circuit, etc. are provided, and the liquid crystal display devices are completed. The details of these steps are not described.

As described above, according to the present embodiment, the atmospheric pressure is applied to the glass substrates, and a uniform outer pressure is applied to the glass substrates, whereby the glass substrates can be bonded, secured in good condition, and a plurality of liquid crystal display panels can be manufactured efficiently.

Modified Embodiments

The present invention is not limited to the above-described embodiments and can cover other various modifications.

For example, in the above-described embodiments, the present invention is applied to the manufacture of the liquid crystal display panel using glass substrates. However, the present invention may be applied to the manufacture of the liquid crystal display panels using substrates of other materials, such as plastic substrates, etc., in place of glass substrates.

What is claimed is:
1. A liquid crystal display panel manufacturing method comprising the steps of:
applying a seal agent to at least one of a pair of substrate, as enclosing a cell region having a main region and an appendix region;
opposing the pair of substrates at a prescribed gap therebetween to form a panel having a cell space;
depressurizing the interior of the cell space through an opening formed in the appendix region in at least one of the pair of substrates to securely bond the pair of substrates to each other;
injecting a liquid crystal through the opening of the appendix region into the cell space; and
cutting out the appendix region of the panel
wherein
in the securely bonding step, the interior of the cell space is evacuated through the opening communicating the cell space between the pair of substrates and the pressure around the pair of substrates is maintained at atmospheric pressure, and in the liquid crystal injecting step, a liquid crystal is dropped into the opening to inject the liquid crystal into the depressurized cell space.

2. A liquid crystal display panel manufacturing method comprising the steps of:

forming a panel including a pair of substrates opposed to each other with a cell space therebetween, a seal agent being applied to at least one of the pair of substrates as enclosing a cell region having a main region and an appendix region, and a through-hole being formed through the appendix region of the pair of substrates in communication with the cell space between the pair of substrates;

arranging a plurality of the panels with the through-holes of the respective panels in alignment with each other, and inserting a pipe having an opening formed in the side;

evacuating through one end of the pipe with the other end of the pipe closed to depressurize the interiors of the cells spaces of the plurality of the panels through the through-holes in the appendix regions of the plurality of the panels via the opening of the pipe to thereby bond the pair of substrates of the respective panel, secured;

injecting a liquid crystal to said the other end of the pipe with said one end of the pipe closed to thereby inject the liquid crystal into the cell spaces of the respective panels through the through-holes in the appendix region of the plurality of panels through the opening of the pipe; and cutting out the appendix regions of the plurality of panels.

3. A liquid crystal display panel manufacturing method according to claim 2, wherein the opening of the pipe is formed in the side surface of the pipe and is a slit of a length which corresponds to a thickness of the whole arranged plurality of the panels.

4. A liquid crystal display panel according to claim 2, wherein the opening of the pipe is formed in the side of the pipe and is a plurality of holes distributed along a length corresponding to a thickness of the whole arranged plurality of the panels.

5. A liquid crystal display panel manufacturing method according to claim 1, wherein the seal agent is a thermo-curing resin, and in said securely bonding step, heating is made to cure the seal agent.

6. A liquid crystal display panel manufacturing method according to claim 1, wherein the seal agent is a photo-curing resin, and in said securely bonding step, light is applied to cure the seal agent.

* * * * *